(12) United States Patent
Mason et al.

(10) Patent No.: US 12,218,341 B2
(45) Date of Patent: Feb. 4, 2025

(54) ELECTROACTIVE MATERIALS FOR METAL-ION BATTERIES

(71) Applicant: Nexeon Limited, Oxfordshire (GB)

(72) Inventors: Charles A. Mason, Oxford (GB); Richard Gregory Taylor, Penarth (GB); James Farrell, Oxford (GB); William James Macklin, Wantage (GB); Christopher Michael Friend, Oxfordshire (GB)

(73) Assignee: Nexeon Limited, Abingdon (GB)

( * ) Notice: Subject to any disclaimer, the term of this patent is extended or adjusted under 35 U.S.C. 154(b) by 624 days.

(21) Appl. No.: 17/292,262

(22) PCT Filed: Nov. 8, 2019

(86) PCT No.: PCT/GB2019/053175
§ 371 (c)(1),
(2) Date: Oct. 7, 2021

(87) PCT Pub. No.: WO2020/095066
PCT Pub. Date: May 14, 2020

(65) Prior Publication Data
US 2022/0123282 A1    Apr. 21, 2022

Related U.S. Application Data

(63) Continuation of application No. 16/274,185, filed on Feb. 12, 2019, now Pat. No. 11,165,054.

(30) Foreign Application Priority Data

Nov. 8, 2018  (GB) .................. 1818235
Dec. 19, 2018 (GB) .................. 1820742
Sep. 9, 2019  (GB) .................. 1912992

(51) Int. Cl.
| H01M 4/36 | (2006.01) |
| H01B 1/18 | (2006.01) |
| H01M 4/133 | (2010.01) |
| H01M 4/134 | (2010.01) |
| H01M 4/38 | (2006.01) |
| H01M 4/587 | (2010.01) |
| H01M 4/02 | (2006.01) |

(52) U.S. Cl.
CPC .......... *H01M 4/364* (2013.01); *H01M 4/133* (2013.01); *H01M 4/134* (2013.01); *H01M 4/386* (2013.01); *H01M 4/587* (2013.01); *H01M 2004/021* (2013.01); *H01M 2004/027* (2013.01)

(58) Field of Classification Search
CPC ........ H01M 4/36; H01M 4/133; H01M 4/134; H01M 4/1393; H01M 4/1395; H01M 4/38; H01M 4/587; H01M 4/04; H01M 4/131; H01M 4/62; H01M 4/66
See application file for complete search history.

(56) References Cited

U.S. PATENT DOCUMENTS

| 5,624,606 A | 4/1997 | Wilson et al. |
| 5,798,137 A | 8/1998 | Lord et al. |
| 7,361,431 B2 | 4/2008 | Kim et al. |
| 7,722,991 B2 | 5/2010 | Zhang et al. |
| 8,057,900 B2 | 11/2011 | Luhrs et al. |
| 8,361,659 B2 | 1/2013 | Richard |
| 8,562,869 B2 | 10/2013 | Mah et al. |
| 8,673,502 B2 | 3/2014 | Petrat et al. |
| 8,778,541 B2 | 7/2014 | Yamamoto et al. |
| 8,906,555 B2 | 12/2014 | Hwang et al. |
| 8,945,431 B2 | 2/2015 | Schulz et al. |
| 9,039,939 B2 | 5/2015 | Sano |
| 9,373,838 B2 | 6/2016 | Yushin et al. |
| 9,593,413 B2 | 3/2017 | Amine et al. |
| 9,876,221 B2 | 1/2018 | Kim et al. |
| 9,997,784 B2 | 6/2018 | Su et al. |
| 10,000,425 B2 | 6/2018 | Le Costaouec et al. |
| 10,128,490 B2 | 11/2018 | Lee et al. |
| 10,147,950 B2 | 12/2018 | Sakshaug et al. |
| 10,170,753 B2 | 1/2019 | Ren et al. |
| 10,424,786 B1 | 9/2019 | Mason |

(Continued)

FOREIGN PATENT DOCUMENTS

| CN | 102214817 A | 10/2011 |
| CN | 102456876 A | 5/2012 |

(Continued)

OTHER PUBLICATIONS

Bardet et al., "In situ investigation of mesoporous silicon oxidation kinetics using infrared emittance spectroscopy," Phys. Chem. Chem. Phys., 18, 18201-308 (2016).
Cadoret et al., "Silicon Chemical Vapor Deposition on macro and submicron powders in a fluidized bed," Powder Technology, 190(102), 185-91 (2009).
Coppey et al., "Decorated carbon nanotubes by silicon deposition in fluidized bed for Li-ion battery anodes," Chem. Eng. Res. Des. 91, 2491-96 (2013).
Curdts et al., "Upscaling the chemical vapour infiltration process of activated carbon with TMS," Physics Procdia, 46, 248-54 (2013).
Wilson et al., "Lithium Insertion in Carbons Conatining Nanodispersed Silicon," J. Electrochem. Soc., 142(2), 326-332 (1995).
Delhaes, "Chemical vapor deposition and infiltration processes of carbon materials," Carbon, 40, 641-657, (2002).

(Continued)

*Primary Examiner* — Haidung D Nguyen
(74) *Attorney, Agent, or Firm* — McDonnell Boehnen Hulbert & Berghoff LLP

(57) ABSTRACT

This invention relates to particulate electroactive materials consisting of a plurality of composite particles, wherein the composite particles comprise: (a) a porous carbon framework including micropores and/or mesopores having a total volume of at least 0.6 cm 3/g, wherein at least half of the micropore/mesopore volume is in the form of pores having a diameter of no more than 2 nm; and (b) an electroactive material located within the micropores and/or mesopores of the porous carbon framework. The D 90 particle diameter of the composite particles is no more than 10 nm.

27 Claims, 1 Drawing Sheet

(56) References Cited

U.S. PATENT DOCUMENTS

| | | | |
|---|---|---|---|
| 10,508,335 B1 | 12/2019 | Yilmaz | |
| 10,658,659 B1 | 5/2020 | Mason | |
| 10,938,027 B2 | 3/2021 | Mason | |
| 10,964,940 B1* | 3/2021 | Mason | H01M 4/1393 |
| 11,011,748 B2* | 5/2021 | Mason | H01M 10/0525 |
| 11,165,054 B2 | 11/2021 | Mason et al. | |
| 11,611,070 B2* | 3/2023 | Costantino | C04B 38/0032 |
| 11,611,071 B2* | 3/2023 | Costantino | H01M 4/1395 |
| 11,639,292 B2* | 5/2023 | Costantino | C01B 32/05 |
| | | | 423/349 |
| 11,688,849 B2* | 6/2023 | Mason | H01M 4/366 |
| | | | 252/500 |
| 11,695,110 B2* | 7/2023 | Mason | H01M 4/364 |
| | | | 252/500 |
| 2006/0057355 A1 | 3/2006 | Suzuki et al. | |
| 2011/0200874 A1 | 8/2011 | Ono et al. | |
| 2011/0309310 A1 | 12/2011 | Koller et al. | |
| 2012/0156493 A1 | 6/2012 | Maisels | |
| 2012/0264020 A1 | 10/2012 | Burton et al. | |
| 2013/0209348 A1 | 8/2013 | Ludvik | |
| 2013/0280601 A1 | 10/2013 | Geramila | |
| 2013/0344391 A1 | 12/2013 | Yushin et al. | |
| 2014/0057179 A1 | 2/2014 | Yushin et al. | |
| 2014/0162131 A1* | 6/2014 | Friend | H01M 4/1397 |
| | | | 429/232 |
| 2014/0272592 A1 | 9/2014 | Thompkins | |
| 2014/0349183 A1* | 11/2014 | Macklin | H01M 4/134 |
| | | | 429/231.95 |
| 2015/0303458 A1 | 10/2015 | Guo et al. | |
| 2015/0321920 A1 | 11/2015 | Geramila | |
| 2016/0104882 A1 | 4/2016 | Yushin et al. | |
| 2016/0298234 A1 | 10/2016 | Yang | |
| 2016/0351894 A1 | 12/2016 | Wagner et al. | |
| 2017/0092950 A1 | 3/2017 | Xiao et al. | |
| 2017/0170477 A1 | 6/2017 | Sakshaug | |
| 2017/0301917 A1 | 10/2017 | Yuge | |
| 2017/0346084 A1 | 11/2017 | Sakshaug et al. | |
| 2018/0151884 A1 | 5/2018 | Yushin et al. | |
| 2018/0331356 A1 | 11/2018 | Feaver | |
| 2018/0342732 A1 | 11/2018 | Troegel et al. | |
| 2019/0119826 A1* | 4/2019 | Friend | H01M 4/583 |
| 2021/0408530 A1* | 12/2021 | Mason | H01M 4/625 |
| 2022/0149349 A1* | 5/2022 | Mason | H01M 4/364 |

FOREIGN PATENT DOCUMENTS

| | | |
|---|---|---|
| CN | 104577084 A | 4/2015 |
| CN | 105489891 A | 4/2016 |
| CN | 103840140 B | 12/2017 |
| CN | 107425180 A | 12/2017 |
| CN | 107863513 A | 3/2018 |
| CN | 108428876 A | 8/2018 |
| CN | 109004203 A | 12/2018 |
| DE | 102014211012 A1 | 12/2015 |
| EP | 3 086 388 B1 | 6/2018 |
| JP | 2003100284 A | 4/2003 |
| JP | 4069465 B2 | 4/2008 |
| JP | 5647366 B1 | 12/2014 |
| JP | 2016095934 A | 5/2016 |
| JP | 6167127 B2 | 7/2017 |
| JP | 6451340 B2 | 1/2019 |
| KR | 101665099 B1 | 10/2016 |
| KR | 20160126857 A | 11/2016 |
| KR | 20180024922 A | 3/2018 |
| KR | 20180078176 A | 7/2018 |
| KR | 101898110 B1 | 9/2018 |
| WO | WO 200227822 A1 | 4/2002 |
| WO | WO 2012097969 A1 | 7/2012 |
| WO | WO 2016116323 A1 | 7/2016 |
| WO | WO 2017040299 A1 | 3/2017 |
| WO | WO 2018165610 A1 | 9/2018 |
| WO | WO 2018166735 A1 | 9/2018 |

OTHER PUBLICATIONS

Holzapfel et al., "A new type of nano-sized silicon/carbon composite electrode for reversible lithium insertion," Chem. Commun., 1566-68 (2005).

Holzapfel et al., "Chemical Vapor Deposited Silicon/Graphite Compound Material as Negative Electrode for Lithium-Ion Batteries," Electrochem. and Sol. State Lett., 8(10), A516-520 (2005).

Holzapfel et al., "Nano silicon for lithium-ion batteries," Electrochem. Acta, 52, 973-78 (2006).

Jaumann et al., "Dichlorosilane-Derived Nano-Silicon inside Hollow Carbon Spheres as High-Performance Anode in Li-Ion Batteries," J. Mater. Chem. A, 5, 9262-9271 (2017).

Jaumann et al.,"SEI-component formation on sub 5 nm sized silicon nanoparticles in Li-ion batteries: the role of electrode preparation, FEC addition and binders," Phys. Chem. Chem. Phus., 17(38), 24956-67 (2015).

Kaae, J. L., "Coating of small particles by chemical vapor deposition while the particles are fluidized," Mat. Res. Soc. Symp. Proc. 372, 139 (1995).

Krzeminski et al., "Silicon dry oxidation kinetics at low temperature in the nanometric range: modeling and experiment," arXiv:1106.3160v1, available at https://arxiv.org/pdf/1106.3160v1.pdf, 54 pages (2011).

Magasinksi et al., "High-performance lithium-ion anodes using a hierachical bottom-up approach," Nature Materials, 9(4), 352-58 (2010).

Kouadri-Mostefa et al., "Silicon Chemical Vapor Deposition (CVD) on microporous powders in a fluidized bed," Powder Technology, 120, 82-87 (2001).

Pflitsch et al., "Chenmical vapor infiltration of activated carbon with tetramethylsilate," Carbon, 79(1), 28-35 (2014).

Reuge et al.,"Modeling of Silicon CVD into Agglomerates of Sub/micrometersiz Particles in a Fluidized Bed," Chem. Vap. Deposition 17, 305-311 (2011).

Saito et al., "Solution combustion synthesis of porous Sn—C composite as anode material for lithium ion batteries," Adv. Powder. Tech., 27,1730-37 (2016).

Vahlas et al., "Principles and applications of CVD powder technology," Mat. Sci. and Eng., R53, 1-72 (2006).

Wang et al., "Chemical vapor deposition and atomic layer deposition for advanced lithium ion batteries and supercapacitors," Energy & Env. Sci., 8, 1889-2014 (2015).

Wang et al., "Facile Preparation of Hierarchically Porous Carbon Monoliths with Well-Ordered Mesostructures," Chem. Mater., 18, 6373-6381 (2006).

Wang et al.,"Synthesis of monolithic 3D ordered macroporous carbon/nano-silicon composites by diiodosilane decomposition," Carbon, 46, 1702-1710 (2008).

Wilson et al., "Carbonaceous Materials Containing Silicon as Anodes for Lithium-Ion Cells," Mat. Res. Soc. Symp. Proc., vol. 393, 305 (1995).

Wilson et al., "Nanodispersed silicon in pregraphitic Carbons," J. Appl. Lett. Phys., 77, 2363-69 (1995).

Yano et al. "Novel method to incorporate Si into monodispersed mesoporous carbon spheres," J. Colloid and Int. Sci., 479, 20-24 (2016).

Yano et al., "Incorporation of silicon into monodispersed starburst carbon spheres with LVD method," Microporous and Mesoporous Mat., 247, 46-51 (2017).

Zhang et al.,"Tin-Nanoparticles Encapsulated in Elastic Hollow Carbon Spheres," Adv. Mater. 20, 1160-1165 (2008).

Search and Examination Report issued in co-pending Great Britain Patent Application No. GB1818232.9, dated Dec. 24, 2018, 9 pages.

Search and Examination Report issued in co-pending Great Britain Patent Application No. GB1818235.2, dated Dec. 24, 2018, 9 pages.

Search and Examination Report issued in co-pending Great Britain Patent Application No. GB1820736.5, dated Jan. 9, 2019, 9 pages.

Search and Examination Report issued in co-pending Great Britain Patent Application No. GB1820742.3, dated Jan. 9, 2019, 9 pages.

Co-Pending U.S. Appl. No. 16/247,182, filed Feb. 12, 2019.

Co-Pending U.S. Appl. No. 16/274,187, filed Feb. 12, 2019.

(56) References Cited

OTHER PUBLICATIONS

Co-Pending U.S. Appl. No. 16/275,246, filed Feb. 13, 2019.
X. Shen et al., "Research progress on silicon/carbon composite anode materials for lithium-ion battery," J. Energy Chemistry, 27, 1067-1090 (2018).
X. Zuo et al., "Silicon based lithium-ion battery anodes: A chronicle perspective review," Nano Energy, 31, 113-143 (2017).
U.S. Appl. No. 16/274,187, Notice of Allowance, mailed May 9, 2019.
U.S. Appl. No. 16/274,182, Office Action, mailed May 20, 2019.
U.S. Appl. No. 16/275,246, Notice of Allowance, mailed Apr. 1, 2019 (with list of references considered May 8, 2019).
Pu et al., "Controlled Crystallization of Spherical Active Cathode Materials for NiMH and Li-ion Rechargeable Batteries," Journal of New Materials for Electrochemical Systems 8, 235-241 (2005).
Desmon et al., "Influence of particle size distribution on random close packing of spheres," Physical Review E 90, 022204 (2014).
Co-Pending U.S. Appl. No. 17/517,013, filed Nov. 2, 2021.
Malvern Instruments Worldwide, "A Basic Guide to Particle Characterization," White Paper, p. 1-26, (2012).
Copending U.S. Appl. No. 17/316,908, filed May 11, 2021.
Copending U.S. Appl. No. 17/416,162, filed Jun. 15, 2021.
Copending U.S. Appl. No. 17/292,241, filed May 7, 2021.
Copending U.S. Appl. No. 17/416,671, filed Jun. 18, 2021.
Copending U.S. Appl. No. 17/190,024, filed Mar. 2, 2021.
Sugiyama K et al., "Pulse Chemical Vapour Infiltration of SiC in Porous Carbon or SiC Particulate Preform Using an R. F. Heating System," J. Materials Sci., 25(10), 4511-17 (1990).
International Search Report in International Patent Application PCT/GB2019/053175, dated Jan. 21, 2020.
Malvern Instruments, "A Basic Guide to Particle Size Characterization," May 2012.
R. Zhang et al., "Highly Reversible and Large Lithium Storage in Mesoporous Si/C Nanocomposite Anodes with Silicon Nanoparticles Embedded in a Carbon Framework," Adv. Materials, 26(39), 6749-55 (2014).

* cited by examiner

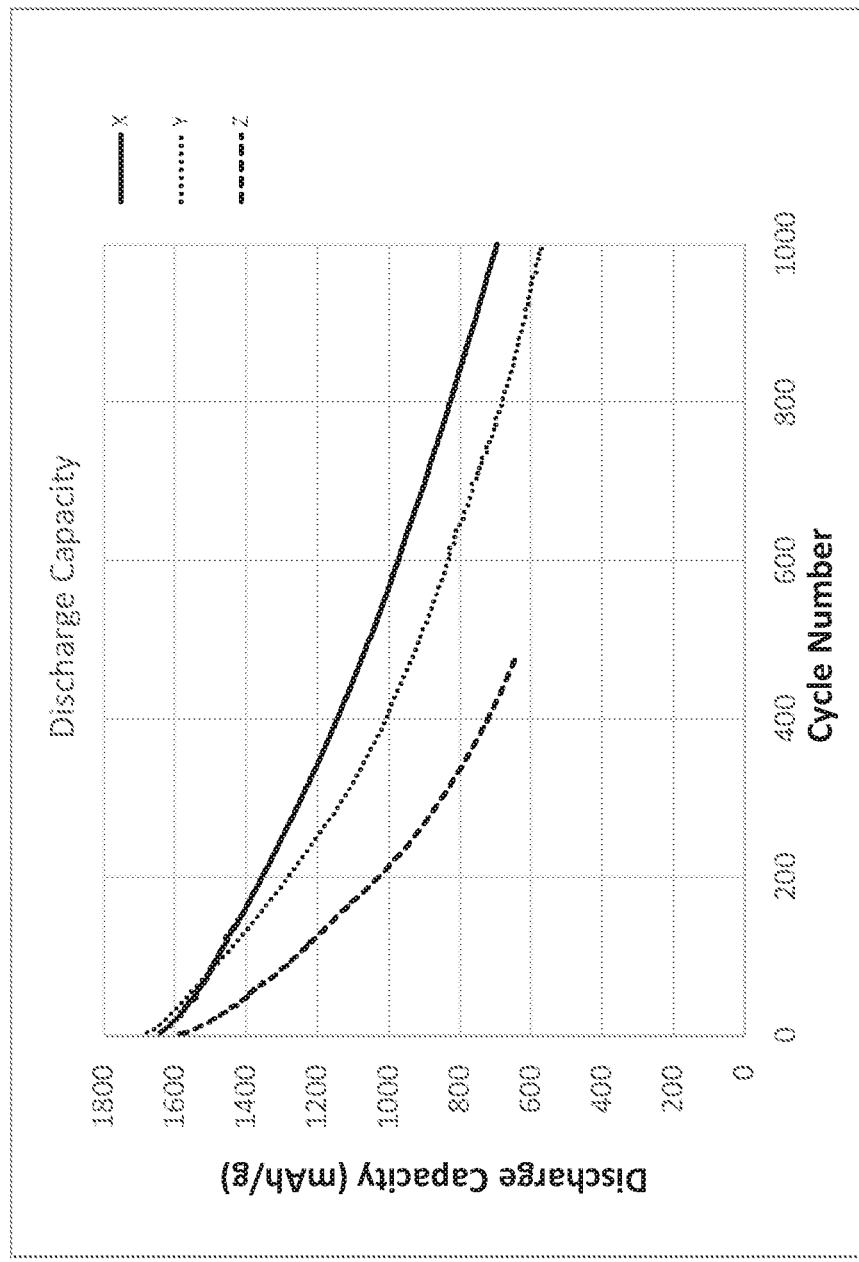

ELECTROACTIVE MATERIALS FOR METAL-ION BATTERIES

The present application is a U.S. National stage application of International Patent Application No. PCT/GB2019/053175 filed Nov. 8, 2019. International Patent Application No. PCT/GB2019/053175 claims priority to United Kingdom Patent Application No. 1818235.2 filed Nov. 8, 2018, United Kingdom Patent Application No. 1820742.3 filed Dec. 19, 2018, U.S. patent application Ser. No. 16/274,185 filed Feb. 12, 2019, and United Kingdom Patent Application No. 1912992.3 filed Sep. 9, 2019, and is a continuation-in-part of U.S. patent application Ser. No. 16/274,185 filed Feb. 12, 2019.

This invention relates in general to electroactive materials that are suitable for use in electrodes for rechargeable metal-ion batteries, and more specifically to particulate materials having high mechanical strength along with high electrochemical capacities that are suitable for use as anode active materials in rechargeable metal-ion batteries.

Rechargeable metal-ion batteries are widely used in portable electronic devices such as mobile telephones and laptops and are finding increasing application in electric or hybrid vehicles. Rechargeable metal-ion batteries generally comprise an anode layer, a cathode layer, an electrolyte to transport metal ions between the anode and cathode layers, and an electrically insulating porous separator disposed between the anode and the cathode. The cathode typically comprises a metal current collector provided with a layer of metal ion containing metal oxide based composite, and the anode typically comprises a metal current collector provided with a layer of an electroactive material, defined herein as a material that is capable of inserting and releasing metal ions during the charging and discharging of a battery. For the avoidance of doubt, the terms "cathode" and "anode" are used herein in the sense that the battery is placed across a load, such that the cathode is the positive electrode and the anode is the negative electrode. When a metal-ion battery is charged, metal ions are transported from the metal-ion-containing cathode layer via the electrolyte to the anode and are inserted into the anode material. The term "battery" is used herein to refer both to a device containing a single anode and a single cathode and to devices containing a plurality of anodes and/or a plurality of cathodes.

There is interest in improving the gravimetric and/or volumetric capacities of rechargeable metal-ion batteries. The use of lithium-ion batteries has already provided a substantial improvement when compared to other battery technologies, but there remains scope for further development. To date, commercial lithium-ion batteries have largely been limited to the use of graphite as an anode active material. When a graphite anode is charged, lithium intercalates between the graphite layers to form a material with the empirical formula $Li_xC_6$ (wherein x is greater than 0 and less than or equal to 1). Consequently, graphite has a maximum theoretical capacity of 372 mAh/g in a lithium-ion battery, with a practical capacity that is somewhat lower (ca. 340 to 360 mAh/g). Other materials, such as silicon, tin and germanium, are capable of intercalating lithium with a significantly higher capacity than graphite but have yet to find widespread commercial use due to difficulties in maintaining sufficient capacity over numerous charge/discharge cycles.

Silicon in particular has been identified as a promising alternative to graphite for the manufacture of rechargeable metal-ion batteries having high gravimetric and volumetric capacities because of its very high capacity for lithium (see, for example, Insertion Electrode Materials for Rechargeable Lithium Batteries, Winter, M. et al. in Adv. Mater. 1998, 10, No. 10). At room temperature, silicon has a theoretical maximum specific capacity in a lithium-ion battery of about 3,600 mAh/g (based on $Li_{15}Si_4$). However, the use of silicon as an anode material is complicated by large volumetric changes on charging and discharging.

Intercalation of lithium into bulk silicon leads to a large increase in the volume of the silicon material, up to 400% of its original volume when silicon is lithiated to its maximum capacity, and repeated charge-discharge cycles cause significant mechanical stress in the silicon material, resulting in fracturing and delamination of the silicon anode material. Volume contraction of silicon particles upon delithiation can result in a loss of electrical contact between the anode material and the current collector. A further difficulty is that the solid electrolyte interphase (SEI) layer that forms on the silicon surface does not have sufficient mechanical tolerance to accommodate the expansion and contraction of the silicon. As a result, newly exposed silicon surfaces lead to further electrolyte decomposition and increased thickness of the SEI layer and irreversible consumption of lithium. These failure mechanisms collectively result in an unacceptable loss of electrochemical capacity over successive charging and discharging cycles.

A number of approaches have been proposed to overcome the problems associated with the volume change observed when charging silicon-containing anodes. The most widespread approach to address the irreversible capacity loss of silicon-containing anodes is to use some form of finely structured silicon as the electroactive material. It has been reported that fine silicon structures below around 150 nm in cross-section, such as silicon films and silicon nanoparticles are more tolerant of volume changes on charging and discharging when compared to silicon particles in the micron size range. However, neither of these is particularly suitable for commercial scale applications in their unmodified form; nanoscale particles are difficult to prepare and handle and silicon films do not provide sufficient bulk capacity. For example, nanoscale particles tend to form agglomerates, making it difficult to obtain a useful dispersion of the particles within an anode material matrix. In addition, the formation of agglomerates of nanoscale particles results in an unacceptable capacity loss on repeated charge-discharge cycling.

Ohara et al. (Journal of Power Sources 136 (2004) 303-306) have described the evaporation of silicon onto a nickel foil current collector as a thin film and the use of this structure as the anode of a lithium-ion battery. Although this approach gives good capacity retention, the thin film structures do not give useful amounts of capacity per unit area, and any improvement is eliminated when the film thickness is increased.

WO 2007/083155 discloses that improved capacity retention may be obtained through the use of silicon particles having high aspect ratio, i.e. the ratio of the largest dimension to the smallest dimension of the particle.

It is also known in general terms that electroactive materials such as silicon may be deposited within the pores of a porous carrier material, such as an activated carbon material. These composite materials provide some of the beneficial charge-discharge properties of nanoscale silicon particles while avoiding the handling difficulties of nanoparticles. For instance, Guo et al. (Journal of Materials Chemistry A, 2013, pp. 14075-14079) discloses a silicon-carbon composite material in which a porous carbon substrate provides an electrically conductive framework with silicon nanoparticles deposited within the pore structure of the substrate with uniform distribution. SEI formation over the initial charging cycles is confined to the remaining pore volume such that the remaining silicon is not exposed to the electrolyte in subsequent charging cycles. It is shown that the composite material has improved capacity retention over multiple charging cycles, however the initial capacity of the composite material in mAh/g is significantly lower than for silicon nanoparticles.

JP2003100284 discloses an active material comprising a carbon-based scaffold with small pores branching off from a few larger pores. An electroactive material (e.g., silicon) is indiscriminately located on the walls of both large and small pores and on the external surface of the carbon-based scaffold.

Despite the efforts to date, there is a continued need for improvements in the electrochemical storage capacity of lithium-ion batteries. In particular, composite materials relying on porous carrier materials with electroactive materials deposited in the pore structure often have inadequate structural strength for commercial use. Conventional electrode fabrication processes typically rely on calendering of electrode materials onto current collectors in order to densify the electrode layers and to optimise space utilisation within a battery design. Highly porous materials are vulnerable to fracturing during electrode fabrication, resulting in impaired electrochemical performance.

The present invention is based on the observation that the mechanical performance of composite particles comprising a porous carbon framework and an electroactive material located within the porous carbon framework can be optimised by using porous carbon frameworks with specific pore structures and simultaneously a carefully controlled pore size distribution.

BRIEF DESCRIPTION OF FIGURES

FIG. 1 is a schematic of the discharge capacity over multiple cycles of three test cells as described herein.

In a first aspect, the invention provides a particulate material comprising of a plurality of composite particles, wherein the composite particles comprise:

(a) a porous carbon framework comprising micropores and/or mesopores,
wherein the micropores and mesopores have a total pore volume as measured by gas adsorption of $P^1$ cm$^3$/g, wherein $P^1$ has a value of at least 0.6,
wherein the $PD_{50}$ pore diameter as measured by gas adsorption is no more than 2 nm; and (b) an electroactive material located within the micropores and/or mesopores of the porous carbon framework:

wherein the composite particles have a $D_{90}$ particle diameter of no more than 10 μm.

The invention therefore relates to a particulate material in which the porous carbon framework has relatively high total volume of micropores and mesopores, with pores having a diameter of no more than 2 nm constituting at least 50% of the total pore volume, together with a particle size distribution that is heavily weighted towards particles with diameters of no more than 10 μm. For the avoidance of doubt, references herein to the pore volume of the porous carbon framework relate (in the absence of any indication to the contrary) to the pore volume of the porous carbon framework in isolation, i.e. as measured in the absence of any electroactive material (or any other material) occupying the pores of the porous carbon framework.

It has been found that the combination of small particles size together with a highly divided pore volume provides an electroactive material with high resistance to mechanical degradation during electrode manufacture. The high fine pore structure of the porous carbon framework results in very fine pore walls, and without being bound by theory, it is believed that these very fine pore walls are able to deform elastically with reduced rate of fracture such that the fracture resistance of the framework under compressive stress is very high. The controlled pore size distribution contributes additionally to particle strength as well as enabling improved close packing of the composite particles in electrode active layers, thereby reducing the need for excessive calendering pressure.

A further benefit of the particulate material of the invention is that the highly microporous carbon framework has high tensile fracture strength, and therefore can accommodate at least part of the expansion of the electroactive material within the pore volume without fracturing. Although full lithiation of the electroactive material may result in some external expansion of the entire composite particle, the amount of external expansion is limited due to the expansion that is accommodated internally. To the extent that the material expands outwardly, the highly microporous carbon framework is able to deform without fracturing. The high total porosity of the porous carbon framework not only provides for high volumetric loadings of electroactive material, but also ensures that the porous carbon framework is sufficiently resilient to withstand repeated volume changes over multiple numbers of charge-discharge cycles.

The highly microporous carbon framework provides the further benefit that electroactive materials are located within the micropore network in the form of small domains with dimensions of the order of a few nanometres or less. These fine electroactive structures have a lower resistance to elastic deformation and higher fracture resistance than larger electroactive structures and are therefore able to lithiate and delithiate without excessive structural stress. The high microporosity of the porous carbon framework therefore not only provides improved mechanical strength of the particles, but also ensures that the electroactive material sufficiently resilient to withstand repeated volume changes over multiple charge-discharge cycles without significant loss of capacity.

Yet another factor in the exceptional performance of the inventive particulate material is that SEI formation is minimised. By locating the electroactive material within small mesopores and/or micropores as described above, only a small area of the electroactive material surface is accessible to electrolyte and so SEI formation is limited. Additional exposure of the electroactive material in subsequent charge-discharge cycles is substantially prevented such that SEI formation is not a significant failure mechanism that could lead to capacity loss. This stands in clear contrast to the excessive and unconstrained SEI formation that characterises the material disclosed by Guo, for example (see above).

The porous carbon framework suitably comprises a three-dimensionally interconnected open pore network comprising a combination of micropores and/or mesopores and optionally a minor volume of macropores. In accordance with conventional IUPAC terminology, the term "micropore" is used herein to refer to pores of less than 2 nm in diameter, the term "mesopore" is used herein to refer to pores of 2 to 50 nm in diameter, and the term "micropore" is used to refer to pores of greater than 50 nm diameter.

References herein to the volume of micropores, mesopores and macropores in the porous carbon framework, and any references to the distribution of pore volume within the porous carbon framework, refer to the internal pore volume of the porous carbon framework taken in isolation (i.e. in the absence of any electroactive material or other materials occupying some or all of the pore volume).

The porous carbon framework is characterised by a high pore volume in the form of micropores and/or mesopores. The total volume of micropores and mesopores (i.e. the total pore volume in the range of 0 to 50 nm) is referred to herein as $P^1$ cm$^3$/g, wherein $P^1$ represents a dimensionless natural number having a value of at least 0.6. More preferably, the value of $P^1$ is at least 0.65, or at least 0.7, or at least 0.75, or at least 0.8, or at least 0.85. Optionally, the value of $P^1$ may be at least 0.9, or at least 0.95, or at least 1, or at least 1.05, or at least 1.1, or at least 1.15, or at least 1.2.

The use of a high porosity carbon framework is advantageous since it allows a larger amount of electroactive material to be accommodated within the pore structure, while the division of the pore volume into fine mesopores and micropores ensures that the composite particles have sufficient resistance to compressive stress to be used in conventional electrode manufacturing processes.

The internal pore volume of the porous carbon framework is suitably capped at a value at which increasing fragility of the porous carbon framework outweighs the advantage of increased pore volume accommodating a larger amount of the electroactive material. In general, the value of $P^1$ may be no more than 2.5. However, more preferably, the value of $P^1$ may be no more than 2.4, or no more than 2.2, or no more than 2, or no more than 1.8, or no more than 1.6, or no more than 1.5, or no more than 1.4, or no more than 1.3, or no more than 1.2, or no more than 1.1, or no more than 1.0, or no more than 0.9. More preferably, the value of $P^1$ is no more than 1.2, or no more than 1.1, or no more than 1.0, or no more than 0.9.

In accordance with the invention, the value of $P^1$ may be, for instance, in the range of from 0.8 to 2.2, or in the range of from 0.85 to 2.2, or in the range of from 0.9 to 2.2, or in the range of from 0.95 to 2.2, or in the range of from 1 to 2.2, or in the range of from 1.05 to 2.2, or in the range of from 1.1 to 2.2, or in the range of from 0.8 to 2, or in the range of from 0.85 to 2, or in the range of from 0.9 to 2, or in the range of from 0.95 to 2, or in the range of from 1 to 2, or in the range of from 1.05 to 2, or in the range of from 1.1 to 2, or in the range of from 0.8 to 1.9, or in the range of from 0.85 to 1.9, or in the range of from 0.9 to 1.9, or in the range of from 0.95 to 1.9, or in the range of from 1 to 1.9, or in the range of from 1.05 to 1.9, or in the range of from 1.1 to 1.9, or in the range of from 0.8 to 1.8, or in the range of from 0.85 to 1.8, or in the range of from 0.9 to 1.8, or in the range of from 0.95 to 1.8, or in the range of from 1 to 1.8, or in the range of from 1.05 to 1.8, or in the range of from 1.1 to 1.8, or in the range of from 0.8 to 1.7, or in the range of from 0.85 to 1.7, or in the range of from 0.9 to 1.7, or in the range of from 0.95 to 1.7, or in the range of from 1 to 1.7, or in the range of from 1.05 to 1.7, or in the range of from 1.1 to 1.7, or in the range of from 0.8 to 1.6, or in the range of from 0.85 to 1.6, or in the range of from 0.9 to 1.6, or in the range of from 0.95 to 1.6, or in the range of from 1 to 1.6, or in the range of from 1.05 to 1.6, or in the range of from 1.1 to 1.6.

Preferably, the value of $P_1$ may be, for instance, in the range from 0.6 to 1.4, or in the range from 0.65 to 1.4, or in the range from 0.7 to 1.4, or in the range from 0.75 to 1.4, or in the range from 0.7 to 1.3, or in the range from 0.75 to 1.3, or in the range from 0.7 to 1.2, or in the range from 0.75 to 1.2, or in the range from 0.7 to 1, or in the range from 0.75 to 1, or in the range from 0.7 to 0.9, or in the range from 0.75 to 0.9.

The $PD_{50}$ pore diameter of the porous carbon framework is no more than 2 nm. The term "$PD_{50}$ pore diameter" as used herein refers to the volume-based median pore diameter, based on the total volume of micropores and mesopores (i.e. the pore diameter below which 50% of the total micropore and mesopore volume, represented by $P^1$, is found). Therefore, in accordance with the invention, at least 50% of the total volume of micropores and mesopores is in the form of pores having a diameter of no more than 2 nm.

As used herein, the general term "$PD_n$ pore diameter" refers to the volume-based nth percentile pore diameter; based on the total volume of micropores and mesopores. For instance, the term "$D_{90}$ pore diameter" as used herein refers to the pore diameter below which 90% of the total micropore and mesopore volume, represented by $P^1$, is found).

For the avoidance of doubt, any macropore volume (pore diameter greater than 50 nm) is not taken into account for the purpose of determining $PD_n$ values.

In accordance with the invention, the $PD_{50}$ pore diameter of the porous carbon framework is preferably no more than 1.8 nm, or no more than 1.6 nm, or no more than 1.4 nm, or no more than 1.2 nm, or no more than 1 nm. Preferably, the $PD_{80}$ pore diameter of the porous carbon framework is at least 0.8 nm, or at least 1 nm, or at least 1.2 nm.

More preferably, at least 60% of the total micropore and mesopore volume of the porous carbon framework is in the form of pores having a diameter of no more than 3 nm. Accordingly, the $PD_{60}$ pore diameter of the porous carbon framework is preferably no more than 3 nm, or no more than 2.5 nm, or no more than 2 nm, or no more than 1.8 nm, or no more than 1.6 nm, or no more than 1.4 nm, or no more than 1.2 nm.

More preferably, at least 70% of the total micropore and mesopore volume of the porous carbon framework is in the form of pores having a diameter of no more than 3.5 nm. Accordingly, the $PD_{70}$ pore diameter of the porous carbon framework is preferably no more than 3.5 nm, or no more than 3 nm, or no more than 2.5 nm, or no more than 2.2 nm; or no more than 2 nm or no more than 2.5 nm; or no more than 2 nm, or no more than 1.8 nm; or no more than 1.6 nm, or no more than 1.4 nm.

More preferably, at least 80% of the total micropore and mesopore volume of the porous carbon framework is in the form of pores having a diameter of no more than 5 nm. Accordingly, the $PD_{80}$ pore diameter of the porous carbon framework is preferably no more than 5 nm, or no more than 4.5 nm, or no more than 4 nm, or no more than 3.5 nm, or no more than 3 nm, or no more than 2.5 nm, or no more than 2.2 nm, or no more than 2 nm, or no more than 1.8 nm, or no more than 1.6 nm.

The volume of larger mesopores in the porous carbon framework is preferably limited such that the $PD_{90}$ pore diameter is no more than 10 nm, or no more than 8 nm, or no more than 6 nm, or no more than 5 nm, or no more than 4 nm, or no more than 3 nm, or no more than 2.5 nm, or no more than 2 nm.

Preferably, the $PD_{95}$ pore diameter is no more than 15 nm, or no more than 12 nm, or no more than 10 nm.

In accordance with the invention, the porous carbon framework may be one in which $PD_{50}$ is no more than 2 nm and $PD_{90}$ is no more than 10 nm, or one in which $PD_{50}$ is no more than 2 nm and $PD_{90}$ is no more than 8 nm, or one in which $PD_{50}$ is no more than 2 nm and $PD_{90}$ is no more than 6 nm; or one in which $PD_{50}$ is no more than 1.8 nm and $PD_{90}$ is no more than 8 nm, or one in which $PD_{50}$ is no more than 1.8 nm and $PD_{90}$ is no more than 6 nm, or one in which $PD_{50}$ is no more than 1.6 nm and $PD_{90}$ is no more than 6 nm, or one in which $PD_{50}$ is no more than 1.2 nm and $PD_{90}$ is no more than 5 nm, or one in which $PD_{50}$ is no more than 1 nm and $PD_{90}$ is no more than 4 nm, or one in which $PD_{50}$ is no more than 1 nm and $PD_{90}$ is no more than 3 nm, or one in which $PD_{50}$ is no more than 1 nm and $PD_{90}$ is no more than 2.5 nm, or one in which $PD_{50}$ is no more than 1 nm and $PD_{90}$ is no more than 2 nm.

More preferably, the porous carbon framework may be one in which $PD_{50}$ is from 1 to 2 nm and $PD_{90}$ is from 3 to 10 nm, or one in which $PD_{50}$ is from 1 to 2 nm and $PD_{90}$ is from 3 to 8 nm, or one in which $PD_{50}$ is from 1 to 2 nm and $PD_{90}$ is from 3 to 6 nm, or one in which $PD_{50}$ is from 1 to 1.8 nm and $PD_{90}$ is from 3 to 8 nm, or one in which $PD_{50}$ is from 1 to 1.8 nm and $PD_{90}$ is from 3 to 6 nm, or one in which $PD_{50}$ is from 1 to 1.6 nm and $PD_{90}$ is from 3 to 6 nm.

A fraction of pores having diameters in the larger mesopore range may be advantageous to facilitate electrolyte access to the electroactive material. Therefore, pores having a diameter in the range of 5 to 50 nm (i.e. larger mesopores) may optionally constitute at least 1%, at least 2%, at least 5% or at least 10% of the total micropore and mesopore volume of the porous carbon framework.

The volumetric ratio of micropores to mesopores in the porous carbon framework may range in principle from 100:0 to 50:50. Preferably, the volumetric ratio of micropores to mesopores is from 90:10 to 55:45, ort from 90:10 to 60:40, or from 85:15 to 65:35.

The pore size distribution of the porous carbon framework may be monomodal, bimodal or multimodal. As used herein, the term "pore size distribution" relates to the distribution of pore size relative to the cumulative total internal pore volume of the porous carbon framework. A bimodal or multimodal pore size distribution may be preferred since close proximity between the pores up to 5 nm in diameter and pores of larger diameter provides the advantage of efficient ionic transport through the porous network to the electroactive material. Accordingly, the particulate material has high ionic diffusivity and therefore improved rate performance.

Optionally; the porous carbon framework has a bimodal or multimodal pore size distribution including at least one peak at less than 2 nm and at least one peak in the range of from 2.5 to 20 nm, preferably with a local minimum in the pore size distribution in the range of from 2 to 50 nm. More preferably, the porous carbon framework has a bimodal or multimodal pore size distribution including at least one peak at less than 2 nm and at least one peak in the range of from 2.5 to 15 nm, preferably with a local minimum in the pore size distribution in the range of from 2 to 5 nm.

Suitably, a bimodal or multimodal pore size distribution includes a peak pore size in the micropore range and a peak pore size in the mesopore size range which differ from one another by a factor of from 5 to 20, more preferably by a factor of about 10. For instance, the porous carbon framework may have a bimodal pore size distribution including a peak at a pore size of 1.2 nm and a peak at a pore size of 12 nm.

The total volume of micropores and mesopores and the pore size distribution of micropores and mesopores are determined using nitrogen gas adsorption at 77 K down to a relative pressure $p/p_0$ of $10^{-6}$. using quenched solid density functional theory (QSDFT) in accordance with standard methodology as set out in ISO 15901-2 and ISO 15901-3. Nitrogen gas adsorption is a technique that characterizes the porosity and pore diameter distributions of a material by allowing a gas to condense in the pores of a solid. As pressure increases, the gas condenses first in the pores of smallest diameter and the pressure is increased until a saturation point is reached at which all of the pores are filled with liquid. The nitrogen gas pressure is then reduced incrementally, to allow the liquid to evaporate from the system. Analysis of the adsorption and desorption isotherms, and the hysteresis between them, allows the pore volume and pore size distribution to be determined. Suitable instruments for the measurement of pore volume and pore size distributions by nitrogen gas adsorption include the TriStar II and TriStar II Plus porosity analyzers, which are available from Micromeritics Instrument Corporation, USA, and the Autosorb IQ porosity analyzers, which are available from Quantachrome Instruments.

Nitrogen gas adsorption is effective for the measurement of pore volume and pore size distributions for pores having a diameter up to 50 nm, but is less reliable for pores of much larger diameter. For the purposes of the present invention, nitrogen adsorption is therefore used to determine pore volumes and pore size distributions only for pores having a diameter up to and including 50 nm. As set out above, the value of $P^1$ is determined by taking into account only pores of diameter up to and including 50 nm (i.e. only micropores and mesopores), and the values of $PD_n$ are likewise determined relative to the total volume of micropores and mesopores only.

In view of the limitations of available analytical techniques it is not possible to measure pore volumes and pore size distributions across the entire range of micropores, mesopores and macropores using a single technique. In the case that the porous carbon framework comprises macropores, the volume of pores in the range of greater than 50 nm and up to 100 nm is identified herein with the value of $P^2$ $cm^3/g$ and is measured by mercury porosimetry. As set out above, the value of $P^2$ relates to the pore volume of the porous carbon framework taken in isolation (i.e. in the absence of any electroactive material or other materials occupying some or all of the pore volume).

For the avoidance of doubt, the value of $P^2$ takes into account only pores having a diameter of from greater than 50 nm up to and including 100 nm, i.e. it includes only the volume of macropores up to 100 nm in diameter. Any pore volume measured by mercury porosimetry at pore sizes of 50 nm or below is disregarded for the purposes of determining the value of $P^2$ (as set out above, nitrogen adsorption is instead used to characterize the mesopores and micropores). Pore volume measured by mercury porosimetry above 100 nm is assumed for the purposes of the invention to be inter-particle porosity and is also not take into account when determining the value of $P^2$.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. Values obtained by mercury porosimetry as reported herein are obtained in accordance with ASTM UOP578-11, with the surface tension y taken to be 480 mN/m and the contact angle φ taken to be 140° for mercury at room temperature. The density of mercury is taken to be 13.5462 $g/cm^3$ at room temperature. A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology, 1997, Micromeritics Instrument Corporation, ISBN 0-9656783-0.

The volume of macropores is preferably small as compared to the volume of micropores and mesopores. While a small fraction of macropores may be useful to facilitate electrolyte access into the pore network, the advantages of the invention are obtained substantially by accommodating the pore volume predominantly in micropores and smaller mesopores.

Thus, in accordance with the invention the total volume of macropores in the porous carbon framework is $P^2$ cm$^3$/g as measured by mercury porosimetry, wherein $P^2$ preferably has a value of no more than $0.2 \times P^1$, or no more than $0.1 \times P^1$, or no more than $0.05 \times P^1$, or no more than $0.02 \times P^1$, or no more than $0.01 \times P^1$, or no more than $0.005 \times P^1$.

In preferred embodiments, $P^2$ has a value of no more than 0.3, or no more than 0.25, or no more than 0.20, or no more than 0.15, or no more than 0.1, or no more than 0.05. As discussed above in relation to larger mesopores, a small pore volume fraction in the macropore range may be advantageous to facilitate electrolyte access to the electroactive material.

The open pore network optionally includes a hierarchical pore structure, i.e. a pore structure in which there is a degree of ordering of pore sizes, with smaller pores branching from larger pores.

It will be appreciated that intrusion techniques such as gas adsorption and mercury porosimetry are effective only to determine the pore volume of pores that are accessible to nitrogen or to mercury from the exterior of the porous carbon framework. Porosity values ($P^1$ and $P^2$) as specified herein shall be understood as referring to the volume of open pores, i.e. pores that are accessible to a fluid from the exterior of the porous carbon framework. Fully enclosed pores which cannot be identified by nitrogen adsorption or mercury porosimetry shall not be taken into account herein when specifying porosity values. Likewise, any pore volume located in pores that are so small as to be below the limit of detection by nitrogen adsorption is not taken into account for determining the value of $P^1$.

The term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found.

The terminology "$D_n$" used herein to define particle diameter distributions should be distinguished from the terminology "$PD_n$" which is used herein, as described above, to define pore diameter distributions.

Particle diameters and particle size distributions can be determined by routine laser diffraction techniques in accordance with ISO 13320:2009. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer™ 3000 particle size analyzer from Malvern Instruments. The Malvern Mastersizer™ 3000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in distilled water. The particle refractive index is taken to be 3.50 and the dispersant index is taken to be 1.330. Particle size distributions are calculated using the Mie scattering model.

The $D_{90}$ particle diameter of the composite particles is preferably no more than 9.5 µm, or no more than 9 µm, or no more than 8.5 µm, or no more than 8 µm, or no more than 7.5 µm, or no more than 7 µm, or no more than 6.5 µm, or no more than 6 µm, or no more than 5.5 µm, or no more than 5 µm, or no more than 4.5 µm, or no more than 4 µm.

The composite particles may have a $D_{50}$ particle diameter in the range of from 0.5 to 7 µm. Optionally, the $D_{50}$ particle diameter of the composite particles may be at least 1 µm, or at least 1.5 µm, or at least 2 µm, or at least 2.5 µm, or at least 3 µm.

Optionally the $D_{50}$ particle diameter of the composite particles may be no more than 6.5 µm, or no more than 6 µm, or no more than 5.5 µm, or no more than 5 µm, or no more than 4.5 µm, or no more than 4 µm, or no more than 3.5 µm.

For instance, the composite particles may have a $D_{50}$ particle diameter in the range of from 1 to 6.5 µm, or from 1.5 to 6 µm, or from 2 to 5.5 µm, or from 2.5 to 5 µm, or from 3 to 4.5 µm. Particles within these size ranges and having porosity and a pore diameter distribution as set out herein are ideally suited for use in anodes for metal-ion batteries, due to their dispersibility in slurries, their structural robustness, their capacity retention over repeated charge-discharge cycles, and their suitability for forming dense electrode layers of uniform thickness without structural degradation.

The $D_{10}$ particle diameter of the composite particles is preferably at least 0.2 µm, or at least 0.5 µm, or at least 0.8 µm, or at least 1 µm, or at least 1.5 µm, or at least 2 µm. By maintaining the $D_{10}$ particle diameter at 0.2 µm or more, the potential for undesirable agglomeration of sub-micron sized particles is reduced, resulting in improved dispersibility of the particulate material and improved capacity retention.

The $D_{99}$ particle diameter of the composite particles is preferably no more than 25 µm, or no more than 20 µm, or no more than 18 µm, or no more than 15 µm, or no more than 12 µm, or no more than 10 µm, or no more than 9 µm, or no more than 8 µm, or no more than 7 µm, or no more than 6 µm, or no more than 5 µm.

The particle size preferably has a positive skew in the volume-based distribution, i.e. such that the volume based distribution is asymmetric with a longer tail on the right hand side. A positive skew in the volume-based particle size distribution is advantageous since it provides a denser electrode since the natural packing factor will be higher than if all particles are the same size, thereby reducing the need for calendering or other physical densification processes.

The composite particles preferably have a narrow size distribution span. For instance, the particle size distribution span (defined as $(D_{90}-D_{10})/D_{50}$) is preferably no more than 8, and may optionally be 5 or less, or 4 or less, or 3 or less. Preferably, the particle size distribution span is at least 1, and may optionally be at least 1.5, or at least 2.

The composite particles are preferably spheroidal in shape. Spheroidal particles as defined herein may include both spherical and ellipsoidal particles and the shape of the composite particles of the invention may suitably be defined by reference to the sphericity and the aspect ratio of the particles of the invention. Spheroidal particles are found to be particularly well-suited to dispersion in slurries without the formation of agglomerates. In addition, the use of porous spheroidal particles is surprisingly found to provide a further improvement in strength when compared to porous particles and porous particle fragments of irregular morphology.

The sphericity of an object is conventionally defined as the ratio of the surface area of a sphere to the surface area of the object, wherein the object and the sphere have identical volume. However, in practice it is difficult to measure the surface area and volume of individual particles at the micron scale. However, it is possible to obtain highly accurate two-dimensional projections of micron scale particles by scanning electron microscopy (SEM) and by dynamic image analysis, in which a digital camera is used to record the shadow projected by a particle. The term "sphericity" as used herein shall be understood as the ratio of the area of the particle projection to the area of a circle, wherein the particle projection and circle have identical circumference. Thus, for an individual particle, the sphericity S may be defined as:

$$S = \frac{4 \cdot \pi \cdot A_m}{(C_m)^2}$$

wherein $A_m$ is the measured area of the particle projection and $C_m$ is the measured circumference of the particle projection. The average sphericity $S_{av}$ of a population of particles as used herein is defined as:

$$S_{av} = \frac{1}{n}\sum_{i=1}^{n}\left[\frac{4 \cdot \pi \cdot A_m}{(C_m)^2}\right]$$

wherein n represents the number of particles in the population.

As used herein, the term "spheroidal" as applied to the composite particles of the invention shall be understood to refer to a material having an average sphericity of at least 0.70. The porous particles of the invention preferably have an average sphericity of at least 0.85, or at least 0.90, or at least 0.92, or at least 0.93, or at least 0.94, or at least 0.95. Optionally, the porous spheroidal particles may have an average sphericity of at least 0.96, or at least 0.97, or at least 0.98, or at least 0.99.

Preferably, sphericity within these preferred ranges is combined with a positive skew in the volume-based particles size distribution in order to obtain optimum packing of the particles into dense electrode layers, while reducing the need for physical densification, e.g. by calendaring.

It will be understood that the circumference and area of a two-dimensional particle projection will depend on the orientation of the particle in the case of any particle which is not perfectly spheroidal. However, the effect of particle orientation may be offset by reporting sphericity and aspect ratios as average values obtained from a plurality of particles having random orientation. A number of SEM and dynamic image analysis instruments are commercially available, allowing the sphericity and aspect ratio of a particulate material to be determined rapidly and reliably. Unless stated otherwise, sphericity values as specified or reported herein are as measured by a CamSizer XT particle analyzer from Retsch Technology GmbH. The CamSizer XT is a dynamic image analysis instrument which is capable of obtaining highly accurate distributions of the size and shape for particulate materials in sample volumes of from 100 mg to 100 g, allowing properties such as average sphericity and aspect ratios to be calculated directly by the instrument.

The porous carbon framework may comprise crystalline carbon or amorphous carbon, or a mixture of amorphous and crystalline carbon. The porous carbon framework may be either a hard carbon or soft carbon framework and may suitably be obtained by known procedures involving the pyrolysis of polymers.

As used herein, the term "hard carbon" refers to a disordered carbon matrix in which carbon atoms are found predominantly in the $sp^2$ hybridised state (trigonal bonds) in nanoscale polyaromatic domains. The polyaromatic domains are cross-linked with a chemical bond, e.g. a C—O—C bond. Due to the chemical cross-linking between the polyaromatic domains, hard carbons cannot be converted to graphite at high temperatures. Hard carbons have graphite-like character as evidenced by the large G-band (~1600 cm-1) in the Raman spectrum. However, the carbon is not fully graphitic as evidenced by the significant D-band (~1350 cm-1) in the Raman spectrum.

As used herein, the term "soft carbon" also refers to a disordered carbon matrix in which carbon atoms are found predominantly in the $sp^2$ hybridised state (trigonal bonds) in polyaromatic domains having dimensions in the range of 5 to 200 nm. In contrast to hard carbons, the polyaromatic domains in soft carbons are associated by intermolecular forces but are not cross-linked with a chemical bond. This means that they will graphitise at high temperature. The porous carbon framework preferably comprises at least 50% $sp^2$ hybridised carbon as measured by XPS. For example, the porous carbon framework may suitably comprise from 50% to 98% $sp^2$ hybridised carbon, from 55% to 95% $sp^2$ hybridised carbon, from 60% to 90% $sp^2$ hybridised carbon, or from 70% to 85% $sp^2$ hybridised carbon.

A variety of different materials may be used to prepare suitable porous carbon frameworks. Examples of organic materials that may be used include plant biomass including lignocellulosic materials (such as coconut shells, rice husks, wood etc.) and fossil carbon sources such as coal. Examples of polymeric materials which form porous carbon frameworks on pyrolysis include phenolic resins, novolac resins, pitch, melamines, polyacrylates, polystyrenes, polyvinylalcohol (PVA), polyvinylpyrrolidone (PVP), and various copolymers comprising monomer units of acrylates, styrenes, α-olefins, vinyl pyrrolidone and other ethylenically unsaturated monomers. A variety of different hard carbon materials are available in the art depending on the starting material and the conditions of the pyrolysis process.

The porous carbon framework may undergo a chemical or gaseous activation process to increase the volume of mesopores and micropores. A suitable activation process comprises contacting pyrolysed carbon with one or more of oxygen, steam, CO, $CO_2$ and KOH at a temperature in the range of from 600 to 1000° C.

Mesopores can also be obtained by known templating processes, using extractable pore formers such as MgO and other colloidal or polymer templates which can be removed by thermal or chemical means post pyrolysis or activation.

The porous carbon framework preferably has a BET surface area of at least 750 m$^2$/g, or at least 1,000 m$^2$/g, or at least 1,250 m$^2$/g, or at least 1,500 m$^2$/g. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277. Preferably, the BET surface area of the conductive porous particle framework is no more than 4,000 m$^2$/g, or no more than 3,500 m$^2$/g, or no more than 3,250 m$^2$/g, or no more than 3,000 m$^2$/g. In some cases, the particulate material of the invention may include pores in which fully enclosed void space is capped by the electroactive material, such that electrolyte access into the void space is prevented.

The electroactive material is suitably selected from silicon, tin, germanium and aluminium and mixtures thereof. A preferred electroactive material is silicon. The electroactive material may optionally comprise a minor amount of one or more dopants. Suitable dopants include boron and phosphorus, other n-type or p-type dopants, or nitrogen. Preferably, the dopants are present in a total amount of no more than 2 wt % based on the total amount of the electroactive material (e.g. silicon) and the dopant(s).

The amount of electroactive material in the composite particles of the invention is preferably selected such that no more than about 55% of the internal pore volume of the porous carbon framework is occupied by the electroactive material (in the uncharged state). This is referred to herein as the "fill factor" of the electroactive material within the porous carbon framework. Preferably, the electroactive material occupies from about 25% to about 45% of the internal pore volume of the porous carbon framework, more preferably from about 25% to 40% of the internal pore volume of the porous carbon framework. Within these preferred ranges, the pore volume of the porous carbon framework is effective to accommodate expansion of the electroactive material during charging and discharging, but avoids excess pore volume which does not contribute to the volumetric capacity of the particulate material. However, the amount of electroactive material is also not so high as to impede effective lithiation due to inadequate metal-ion diffusion rates or due to inadequate expansion volume resulting in mechanical resistance to lithiation.

The weight ratio of the electroactive material to the porous carbon framework can be determined by elemental analysis. Elemental analysis is used to determine the weight percentages of both the electroactive material and carbon in the composite particles. Optionally, the amounts of hydrogen, nitrogen and oxygen may also be determined by elemental analysis. Preferably, elemental analysis is also used to determine the weight percentage of carbon (and optionally hydrogen, nitrogen and oxygen) in the porous carbon framework alone. Determining the weight percentage of carbon in the in the porous carbon framework alone takes account of the possibility that the porous carbon framework contains a minor amount of heteroatoms within its molecular framework. Both measurements taken together allow the weight percentage of the electroactive material relative to the entire porous carbon framework to be determined reliably.

The weight percentage of electroactive materials (such as silicon, germanium, tin and aluminium) is preferably determined by ICP-OES (Inductively coupled plasma-optical emission spectrometry). A number of ICP-OES instruments are commercially available, such as the iCAP® 7000 series of ICP-OES analyzers available from ThermoFisher Scientific. The carbon content of the composite particles and of the porous carbon framework alone (as well as the hydrogen, nitrogen and oxygen content if required) are preferably determined by IR absorption. A suitable instrument for determining carbon, hydrogen, nitrogen and oxygen content is the TruSpec® Micro elemental analyser available from Leco Corporation.

The weight ratio of the electroactive material to the porous carbon framework is a function of the available pore volume, the required fill factor, and the density of the electroactive material.

Where the electroactive material is silicon, the weight ratio of silicon to the porous carbon framework is preferably $[0.5 \times P^1$ to $1.7 \times P^1]:1$, wherein $P^1$ represents the value of the total micropore/mesopore volume as measured in cm$^3$/g. By defining the weight ratio of silicon based on the value of $P^1$, the percentage volumetric occupancy of the pore volume by silicon is controlled within specific limits. Put another way, where the weight ratio of silicon to the porous carbon framework is in the range of $[0.5 \times P^1$ to $1.7 \times P^1]:1$, the volume of silicon in the composite particles is equivalent to approximately 20% to 55% of the total micropore/mesopore volume of the porous carbon framework.

Optionally, the weight ratio of silicon to the porous carbon framework may be in the range of $[0.5 \times P^1$ to $1.3 \times P^1]:1$. More preferably, the weight ratio of silicon to the porous carbon framework is in the range of from $[0.55 \times P^1$ to $1.1 \times P^1]:1$, or in the range of from $[0.6 \times P^1$ to $1.1 \times P^1]:1$, or in the range of from $[0.6 \times P^1$ to $1 \times P^1]:1$, or in the range of from $[0.6 \times P^1$ to $0.95 \times P^1]:1$, or in the range of from $[0.6 \times P^1$ to $0.9 \times P^1]:1$, or in the range of from $[0.65 \times P^1$ to $0.9 \times P^1]:1$, or in the range of from $[0.65 \times P^1$ to $0.85 \times P^1]:1$, or in the range of from $[0.65 \times P^1$ to $0.8 \times P^1]:1$, or in the range of from $[0.7 \times P^1$ to $0.8 \times P^1]:1$.

Optionally, the weight ratio of silicon to the porous carbon framework may be in the range of $[1 \times P^1$ to $1.7 \times P^1]:1$. More preferably, the weight ratio of silicon to the porous carbon framework is in the range of from $[1.1 \times P^1$ to $1.7 \times P^1]:1$, or in the range of from $[1.1 \times P^1$ to $1.65 \times P^1]:1$, or in the range of from $[1.1 \times P^1$ to $1.6 \times P^1]:1$, or in the range of from $[1.15 \times P^1$ to $1.6 \times P^1]:1$, or in the range of from $[1.15 \times P^1$ to $1.55 \times P^1]:1$, or in the range of from $[1.15 \times P^1$ to $1.5 \times P^1]:1$, or in the range of from $[1.2 \times P^1$ to $1.5 \times P^1]:1$, or in the range of from $[1.25 \times P^1$ to $1.5 \times P^1]:1$, or in the range of from $[1.3 \times P^1$ to $1.5 \times P^1]:1$.

Preferably at least 90 wt %, more preferably at least 95 wt %, even more preferably at least 98 wt % of the mass of electroactive material in the composite particles is located within the internal pore volume of the porous carbon framework such that there is no or very little electroactive material located on the external surfaces of the composite particles.

The particulate materials of the invention can be further characterised by their performance under thermogravimetric analysis (TGA) in air. Preferably no more than 10%, more preferably no more than 5%, more preferably no more than 2% of the silicon content of the particulate material is unoxidised at 800° C. when the particulate material is analysed by TGA in air with a temperature ramp rate of 10° C./min.

The determination of the amount of unoxidised silicon is derived from the characteristic TGA trace for these materials. A mass increase at ca. 300-500° C. corresponds to initial oxidation of silicon to $SiO_2$, and is followed by mass loss at ca. 500-600° C. as carbon is oxidised to $CO_2$ gas. Above ca. 600° C., there is a further mass increase corresponding to the continued conversion of silicon to $SiO_2$ which increases toward an asymptotic value above 1000° C. as silicon oxidation goes to completion.

For the purposes of this analysis, it is assumed that any mass increase above 800° C. corresponds to the oxidation of silicon to $SiO_2$ and that the total mass at completion of oxidation is $SiO_2$. This allows the percentage of unoxidised silicon at 800° C. as a proportion of the total amount of silicon to be determined according to the following formula:

$$Z=1.875\times[(M_f-M_{800})/M_f]\times100\%$$

Wherein Z is the percentage of unoxidised silicon at 800° C., $M_f$ is the mass of the sample at completion of oxidation and $M_{800}$ is the mass of the sample at 800° C.

Without being bound by theory, it is understood that the temperature at which silicon is oxidised under TGA corresponds broadly to the length scale of the oxide coating on the silicon due to diffusion of oxygen atoms through the oxide layer being thermally activated. The size of the silicon nanostructure and its location limit the length scale of the oxide coating thickness. Therefore it is understood that silicon deposited in micropores and mesopores will oxidise at a lower temperature than deposits of silicon on a particle surface due to the necessarily thinner oxide coating existing on these structures. Accordingly, preferred materials according to the invention exhibit substantially complete oxidation of silicon at low temperatures consistent with the small length scale of silicon nanostructures that are located in micropores and smaller mesopores. For the purposes of the invention, silicon oxidation at 800° C. is assumed to be silicon on the external surfaces of the porous carbon framework.

The silicon is preferably amorphous silicon. It is believed that amorphous silicon has better performance as an electroactive material. The morphology of the silicon can be determined by known procedures using X-Ray Diffraction (XRD).

Preferably, the volume of micropores and mesopores of the composite particles (i.e. in the presence of the electroactive material), as measured by nitrogen gas adsorption, is no more than $0.15\times P^1$, or no more than $0.10\times P^1$, or no more than $0.05\times P^1$, or no more than $0.02\times P^1$.

The composite particles preferably have a low total oxygen content. Oxygen may be present in the composite particles for instance as part of the porous carbon framework or as an oxide layer on any exposed electroactive material surfaces. Preferably, the total oxygen content of the composite particles is less than 15 wt %, more preferably less than 10 wt %, more preferably less than 5 wt %, for example less than 2 wt %, or less than 1 wt %, or less than 0.5 wt %.

The particulate materials of the invention preferably have a BET surface area of or no more than 300 $m^2/g$, or no more than 250 $m^2/g$, or no more than 200 $m^2/g$, or no more than 150 $m^2/g$, or no more than 100 $m^2/g$, or no more than 80 $m^2/g$, or no more than 60 $m^2/g$, or no more than 40 $m^2/g$, or no more than 30 $m^2/g$, or no more than 25 $m^2/g$, or no more than 20 $m^2/g$, or no more than 15 $m^2/g$, or no more than 10 $m^2/g$. In general, a low BET surface area is preferred in order to minimise the formation of solid electrolyte interphase (SEI) layers at the surface of the composite particles during the first charge-discharge cycle of an anode comprising the particulate material of the invention. However, a BET surface area which is excessively low results in unacceptably low charging rate and capacity due to the inaccessibility of the bulk of the electroactive material to metal ions in the surrounding electrolyte. For instance, the BET surface area is preferably at least 0.1 $m^2/g$, or at least 1 $m^2/g$, or at least 2 $m^2/g$, or at least 5 $m^2/g$. For instance, the BET surface area may be in the range of from 1 $m^2/g$ to 25 $m^2/g$, more preferably in the range of from 2 to 15 $m^2/g$.

The particulate material of the invention typically has a specific charge capacity on first lithiation of 1200 to 2340 mAh/g. Preferably the particulate material of the invention has a specific charge capacity on first lithiation of at least 1400 mAh/g.

The composite particles of the invention are suitably prepared via the chemical vapor infiltration (CVI) of a silicon-containing precursor into the pore structure of the porous carbon framework. As used herein, CVI refers to processes in which a gaseous silicon-containing precursor is thermally decomposed on a surface to form elemental silicon at the surface and gaseous by-products.

Suitable gaseous silicon-containing precursors include silane ($SiH_4$), silane derivatives (e.g. disilane, trisilane and tetrasilane), and trichlorosilane ($SiHCl_3$). The silicon-containing precursors may be used either in pure form or more usually as a diluted mixture with an inert carrier gas, such as nitrogen or argon. For instance, the silicon-containing precursor may be used in an amount in the range from 0.5 to 20 vol %, or 1 to 10 vol %, or 1 to 5 vol % based on the total volume of the silicon-containing precursor and the inert carrier gas. The CVI process is suitably carried out at low partial pressure of silicon precursor with total pressure of 101.3 kPa (i.e. 1 atm), the remaining partial pressure made up to atmospheric pressure using an inert padding gas such as hydrogen, nitrogen or argon. Deposition temperatures ranging from 400 to 700° C. are used, for example from 400 to 550° C., or 400 to 500° C., or 400 to 450° C., or 450 to 500° C. The CVI process may suitably be performed in a fixed bed reactor, fluidized bed reactor (including spouted bed reactor), or rotary kiln.

As an example of a fixed-bed reactor method, 1.8 g of a particulate porous framework was placed on a stainless-steel plate at a constant thickness of 1 mm along its length. The plate was then placed inside a stainless-steel tube of outer diameter 60 mm with gas inlet and outlet lines located in the hot zone of a retort furnace. The furnace tube was purged with nitrogen gas for 30 minutes at room temperature, then the sample temperature was increased to 450 to 500° C. The nitrogen gas flow-rate is adjusted to ensure a gas residence time of at least 90 seconds in the furnace tube and maintained at that rate for 30 minutes. Then, the gas supply is switched from nitrogen to a mixture of monosilane in nitrogen at 1.25 vol. % concentration. Dosing of monosilane is performed over a 5-hour period with a reactor pressure maintained at 101.3 kPa (1 atm). After dosing has finished the gas flow rate is kept constant whilst the silane is purged from the furnace using nitrogen. The furnace is purged for 30 minutes under nitrogen before being cooled down to room temperature over several hours. The atmosphere is then switched over to air gradually over a period of two hours by switching the gas flow from nitrogen to air from a compressed air supply.

The particulate material of the invention may optionally include a conductive carbon coating. Suitably a conductive carbon coating may be obtained by a chemical vapour deposition (CVD) method. CVD is a well-known methodology in the art and comprises the thermal decomposition of a volatile carbon-containing gas (e.g. ethylene) onto the surface of the particulate material. Alternatively, the carbon coating may be formed by depositing a solution of a carbon-containing compound onto the surface of the particulate material followed by pyrolysis. The conductive carbon coating is sufficiently permeable to allow lithium access to the interior of the composite particles without excessive resistance, so as not to reduce the rate performance of the composite particles. For instance, the thickness of the carbon coating may suitably be in the range of from 2 to 30 nm. Optionally, the carbon coating may be porous and/or may only cover partially the surface of the composite particles.

A carbon coating has the advantages that it further reduces the BET surface area of the particulate material by smoothing any surface defects and by filling any remaining surface microporosity, thereby further reducing first cycle loss. In addition, a carbon coating improves the conductivity of the surface of the composite particles, reducing the need for conductive additives in the electrode composition, and also creates an optimum surface for the formation of a stable SEI layer, resulting in improved capacity retention on cycling.

In accordance with the first aspect of the invention, there is further provided particulate materials according to the following aspects 1-1 to 1-16.

Aspect 1-1: A particulate material according to the first aspect of the invention, wherein:
(i) $P^1$ is in the range from 0.6 to 1.4;
(ii) the $PD_{50}$ pore diameter is in the range from 0.8 to 2 nm;
(iii) the $D_{50}$ particle size of the porous carbon framework is in the range from 1 to 18 μm.

Aspect 1-2: A particulate material according to the first aspect of the invention, wherein:
(i) $P^1$ is in the range from 0.6 to 1.4;
(ii) the $PD_{50}$ pore diameter is in the range from 0.8 to 2 nm;
(iii) the $D_{50}$ particle size of the porous carbon framework is in the range from 1 to 12 μm.

Aspect 1-3: A particulate material according to the first aspect of the invention, wherein:
(i) $P^1$ is in the range from 0.6 to 1.4;
(ii) the $PD_{50}$ pore diameter is in the range from 0.8 to 2 nm;
(iii) the $D_{50}$ particle size of the porous carbon framework is in the range from 2 to 8 μm.

Aspect 1-4: A particulate material according to the first aspect of the invention, wherein:
(i) $P^1$ is in the range from 0.6 to 1.4;
(ii) the $PD_{50}$ pore diameter is in the range from 0.8 to 2 nm;
(iii) the $D_{50}$ particle size of the porous carbon framework is in the range from 3 to 6 μm.

Aspect 1-5: A particulate material according to the first aspect of the invention, wherein:
(i) $P^1$ is in the range from 0.7 to 1.2;
(ii) the $PD_{50}$ pore diameter is in the range from 1 to 2 nm;
(iii) the $D_{50}$ particle size of the porous carbon framework is in the range from 1 to 18 μm.

Aspect 1-6: A particulate material according to the first aspect of the invention, wherein:
(i) $P^1$ is in the range from 0.7 to 1.2;
(ii) the $PD_{50}$ pore diameter is in the range from 1 to 2 nm;
(iii) the $D_{50}$ particle size of the porous carbon framework is in the range from 1 to 12 μm.

Aspect 1-7: A particulate material according to the first aspect of the invention, wherein:
(i) $P^1$ is in the range from 0.7 to 1.2;
(ii) the $PD_{50}$ pore diameter is in the range from 1 to 2 nm;
(iii) the $D_{50}$ particle size of the porous carbon framework is in the range from 2 to 8 μm.

Aspect 1-8: A particulate material according to the first aspect of the invention, wherein:
(i) $P^1$ is in the range from 0.7 to 1.2;
(ii) the $PD_{50}$ pore diameter is in the range from 1 to 2 nm;
(iii) the $D_{50}$ particle size of the porous carbon framework is in the range from 3 to 6 μm.

Aspect 1-9: A particulate material according to the first aspect of the invention, wherein:
(i) $P^1$ is in the range from 0.7 to 1;
(ii) the $PD_{50}$ pore diameter is in the range from 1.2 to 2 nm;
(iii) the $D_{50}$ particle size of the porous carbon framework is in the range from 1 to 18 μm.

Aspect 1-10: A particulate material according to the first aspect of the invention, wherein:
(i) $P^1$ is in the range from 0.7 to 1;
(ii) the $PD_{50}$ pore diameter is in the range from 1.2 to 2 nm;
(iii) the $D_{50}$ particle size of the porous carbon framework is in the range from 1 to 12 μm.

Aspect 1-11: A particulate material according to the first aspect of the invention, wherein:
(i) $P^1$ is in the range from 0.7 to 1;
(ii) the $PD_{50}$ pore diameter is in the range from 1.2 to 2 nm;
(iii) the $D_{50}$ particle size of the porous carbon framework is in the range from 2 to 8 μm.

Aspect 1-12: A particulate material according to the first aspect of the invention, wherein:
(i) $P^1$ is in the range from 0.7 to 1;
(ii) the $PD_{50}$ pore diameter is in the range from 1.2 to 2 nm;
(iii) the $D_{50}$ particle size of the porous carbon framework is in the range from 3 to 6 μm.

Aspect 1-13: A particulate material according to the first aspect of the invention, wherein:
(i) $P^1$ is in the range from 0.7 to 1;
(ii) the $PD_{50}$ pore diameter is in the range from 1.2 to 1.8 nm;
(iii) the $D_{50}$ particle size of the porous carbon framework is in the range from 1 to 18 μm.

Aspect 1-14: A particulate material according to the first aspect of the invention, wherein:
(i) $P^1$ is in the range from 0.7 to 1;
(ii) the $PD_{50}$ pore diameter is in the range from 1.2 to 1.8 nm;
(iii) the $D_{50}$ particle size of the porous carbon framework is in the range from 1 to 12 μm;

Aspect 1-15: A particulate material according to the first aspect of the invention, wherein:
(i) $P^1$ is in the range from 0.7 to 1;
(ii) the $PD_{50}$ pore diameter is in the range from 1.2 to 1.8 nm;
(iii) the $D_{50}$ particle size of the porous carbon framework is in the range from 2 to 8 μm;

Aspect 1-16: A particulate material according to the first aspect of the invention, wherein:
(i) $P^1$ is in the range from 0.7 to 1;
(ii) the $PD_{50}$ pore diameter is in the range from 1.2 to 1.8 nm;

(iii) the $D_{50}$ particle size of the porous carbon framework is in the range from 3 to 6 μm;

In accordance with the present invention, it is to be understood that the preferred/optional features disclosed herein in relation to the first aspect of the invention that fall within the scope of the above-described aspects 1-1 to 1-16 are also to be taken as preferred/optional features of the aspects 1-1 to 1-16. Likewise, any features of the dependent claims that fall within the scope of the above-described aspects 1-1 to 1-16 are also to be interpreted as though those claims also depended from aspects 1-1 to 1-16.

In a second aspect of the invention, there is provided a composition comprising a particulate material according to the first aspect of the invention and at least one other component. The particulate material used to prepare the composition of the second aspect of the invention may have any of the features described as preferred or optional with regard to the first aspect of the invention, and may be a particulate material according to any of aspects 1-1 to 1-16. In particular, the particulate material of the first aspect of the invention may be used as a component of an electrode composition.

Thus, there is provided a composition comprising a particulate material according to the first aspect of the invention and at least one other component selected from: (i) a binder; (ii) a conductive additive; and (iii) an additional particulate electroactive material. The composition of the invention is useful as an electrode composition, and thus may be used for forming the active layer of an electrode.

The electrode composition may optionally be a hybrid electrode composition which comprises a particulate material according to the first aspect of the invention and at least one additional particulate electroactive material. Examples of additional particulate electroactive materials include graphite, hard carbon, silicon, germanium, gallium, aluminium and lead. The at least one additional particulate electroactive material is preferably selected from graphite and hard carbon, and most preferably the at least one additional particulate electroactive material is graphite.

The particulate material of the invention may constitute from 0.5 to 99.5 wt % of the total dry weight of the electrode composition (i.e. the total dry weight of the particulate material of the invention and any additional particulate electroactive materials, binders and/or conductive additives). More preferably, the electrode composition comprises a high loading of the particulate material of the invention. For instance, the particulate material of the invention may preferably constitute at least 50 wt %, or at least 55 wt %, or at least 60 wt %, or at least 65 wt %, or at least 70 wt %, or at least 75 wt %, or at least 80 wt %, or at least 85 wt %, or at least 90 wt %, or at least 95 wt % of the total dry weight of the electrode composition.

The electrode composition may optionally comprise a binder. A binder functions to adhere the electrode composition to a current collector and to maintain the integrity of the electrode composition. Examples of binders which may be used in accordance with the present invention include polyvinylidene fluoride (PVDF), polyacrylic acid (PAA) and alkali metal salts thereof, modified polyacrylic acid (mPAA) and alkali metal salts thereof, carboxymethylcellulose (CMC), modified carboxymethylcellulose (mCMC), sodium carboxymethylcellulose (Na-CMC), polyvinylalcohol (PVA), alginates and alkali metal salts thereof, styrene-butadiene rubber (SBR) and polyimide. The electrode composition may comprise a mixture of binders. Preferably, the binder comprises polymers selected from polyacrylic acid (PAA) and alkali metal salts thereof, and modified polyacrylic acid (mPAA) and alkali metal salts thereof, SBR and CMC.

The binder may suitably be present in an amount of from 0.5 to 20 wt %, preferably 1 to 15 wt % and most preferably 2 to 10 wt %, based on the total dry weight of the electrode composition.

The binder may optionally be present in combination with one or more additives that modify the properties of the binder, such as cross-linking accelerators, coupling agents and/or adhesive accelerators.

The electrode composition may optionally comprise one or more conductive additives. Preferred conductive additives are non-electroactive materials which are included so as to improve electrical conductivity between the electroactive components of the electrode composition and between the electroactive components of the electrode composition and a current collector. The conductive additives may suitably be selected from carbon black, carbon fibers, carbon nanotubes, graphene, acetylene black, ketjen black, metal fibers, metal powders and conductive metal oxides. Preferred conductive additives include carbon black and carbon nanotubes.

The one or more conductive additives may suitably be present in a total amount of from 0.5 to 20 wt %, preferably 1 to 15 wt % and most preferably 2 to 10 wt %, based on the total dry weight of the electrode composition.

In a third aspect, the invention provides an electrode comprising a particulate material as defined with reference to the first aspect of the invention in electrical contact with a current collector. The particulate material used to prepare the electrode of the third aspect of the invention may have any of the features described as preferred or optional with regard to the first aspect of the invention, and may be a particulate material according to any of aspects 1-1 to 1-16.

As used herein, the term current collector refers to any conductive substrate which is capable of carrying a current to and from the electroactive particles in the electrode composition. Examples of materials that can be used as the current collector include copper, aluminium, stainless steel, nickel, titanium and sintered carbon. Copper is a preferred material. The current collector is typically in the form of a foil or mesh having a thickness of between 3 to 500 μm. The particulate materials of the invention may be applied to one or both surfaces of the current collector to a thickness which is preferably in the range of from 10 μm to 1 mm, for example from 20 to 500 μm, or from 50 to 200 μm.

Preferably, the electrode comprises an electrode composition as defined with reference to the second aspect of the invention in electrical contact with a current collector. The electrode composition may have any of the features described as preferred or optional with regard to the second aspect of the invention.

The electrode of the third aspect of the invention may suitably be fabricated by combining the particulate material of the invention (optionally in the form of the electrode composition of the invention) with a solvent and optionally one or more viscosity modifying additives to form a slurry. The slurry is then cast onto the surface of a current collector and the solvent is removed, thereby forming an electrode layer on the surface of the current collector. Further steps, such as heat treatment to cure any binders and/or calendaring of the electrode layer may be carried out as appropriate. The electrode layer suitably has a thickness in the range of from 20 μm to 2 mm, preferably 20 μm to 1 mm, preferably 20 μm to 500 μm, preferably 20 μm to 200 μm, preferably 20 μm to 100 μm, preferably 20 μm to 50 μm.

Alternatively, the slurry may be formed into a freestanding film or mat comprising the particulate material of the invention, for instance by casting the slurry onto a suitable casting template, removing the solvent and then removing the casting template. The resulting film or mat is in the form of a cohesive, freestanding mass which may then be bonded to a current collector by known methods.

The electrode of the third aspect of the invention may be used as the anode of a metal-ion battery. Thus, in a fourth aspect, the present invention provides a rechargeable metal-ion battery comprising an anode, the anode comprising an electrode as described above, a cathode comprising a cathode active material capable of releasing and reabsorbing metal ions; and an electrolyte between the anode and the cathode. The particulate material used to prepare the battery of the fourth aspect of the invention may have any of the features described as preferred or optional with regard to the first aspect of the invention, and may be a particulate material according to any of aspects 1-1 to 1-16.

The metal ions are preferably lithium ions. More preferably the rechargeable metal-ion battery of the invention is a lithium-ion battery, and the cathode active material is capable of releasing and lithium ions.

The cathode active material is preferably a metal oxide-based composite. Examples of suitable cathode active materials include $LiCoO_2$, $LiCo_{0.99}Al_{0.01}O_2$, $LiNiO_2$, $LiMnO_2$, $LiCo_{0.5}Ni_{0.5}O_2$, $LiCo_{0.7}Ni_{0.3}O_2$, $LiCo_{0.8}Ni_{0.2}O_2$, $LiCo_{0.82}Ni_{0.18}O_2$, $LiCo_{0.8}Ni_{0.15}Al_{0.05}O_2$, $LiNi_{0.4}Co_{0.3}Mn_{0.3}O_2$ and $LiNi_{0.33}Co_{0.33}Mn_{0.34}O_2$. The cathode current collector is generally of a thickness of between 3 to 500 μm. Examples of materials that can be used as the cathode current collector include aluminium, stainless steel, nickel, titanium and sintered carbon.

The electrolyte is suitably a non-aqueous electrolyte containing a metal salt, e.g. a lithium salt, and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylene carbonates, dimethyl carbonate, diethyl carbonate, gamma butyrolactone, 1,2-dimethoxyethane, 2-methyltetrahydrofuran, dimethylsulfoxide, 1,3-dioxolane, formamide, dimethylformamide, acetonitrile, nitromethane, methylformate, methyl acetate, phosphoric acid triesters, trimethoxymethane, sulfolane, methyl sulfolane and 1,3-dimethyl-2-imidazolidinone.

Examples of organic solid electrolytes include polyethylene derivatives polyethyleneoxide derivatives, polypropylene oxide derivatives, phosphoric acid ester polymers, polyester sulfide, polyvinylalcohols, polyvinylidine fluoride and polymers containing ionic dissociation groups.

Examples of inorganic solid electrolytes include nitrides, halides and sulfides of lithium salts such as $Li_5NI_2$, $Li_3N$, LiI, $LiSiO_4$, $Li_2SiS_3$, $Li_4SiO_4$, LiOH and $Li_3PO_4$.

The lithium salt is suitably soluble in the chosen solvent or mixture of solvents. Examples of suitable lithium salts include LiCl, LiBr, LiI, $LiClO_4$, $LiBF_4$, $LiBC_4O_8$, $LiPF_6$, $LiCF_3SO_3$, $LiAsF_6$, $LiSbF_6$, $LiAlCl_4$, $CH_3SO_3Li$ and $CF_3SO_3Li$.

Where the electrolyte is a non-aqueous organic solution, the metal-ion battery is preferably provided with a separator interposed between the anode and the cathode. The separator is typically formed of an insulating material having high ion permeability and high mechanical strength. The separator typically has a pore diameter of between 0.01 and 100 μm and a thickness of between 5 and 300 μm. Examples of suitable electrode separators include a microporous polyethylene film.

The separator may be replaced by a polymer electrolyte material and in such cases the polymer electrolyte material is present within both the composite anode layer and the composite cathode layer. The polymer electrolyte material can be a solid polymer electrolyte or a gel-type polymer electrolyte.

In a fifth aspect, the invention provides the use of a particulate material as defined with reference to the first aspect of the invention as an anode active material. Preferably, the particulate material is in the form of an electrode composition as defined with reference to the second aspect of the invention, and most preferably the electrode composition comprises one or more additional particulate electroactive materials as defined above. The particulate material used according to the fifth aspect of the invention may have any of the features described as preferred or optional with regard to the first aspect of the invention, and may be a particulate material according to any of aspects 1-1 to 1-16.

EXAMPLES

Example 1

Porous carbon framework particles (activated carbon particles) having the properties set out in Table 1 were provided.

TABLE 1

| Carbon framework | $P^1$ | BET $(m^2/g)$ | $PD_{10}$ (nm) | $PD_{50}$ (nm) | $PD_{90}$ (nm) | Micropore fraction* |
|---|---|---|---|---|---|---|
| A | 0.78 | 1762 | 0.97 | 1.15 | 2.23 | 0.61 |
| B | 0.69 | 1568 | 0.59 | 0.99 | 6.09 | 0.69 |
| C | 1.21 | 2467 | 0.61 | 1.44 | 2.99 | 0.78 |

*volumetric fraction of micropores based on the total volume of micropores and mesopores Silicon-carbon composite particles were prepared by depositing silicon within the pores of the porous carbon framework particles of Table 1 using monosilane gas in a fixed bed reactor at 475° C. as described herein.

Example 2—Compression Testing

The resistance of the particulate material of the invention to mechanical degradation was analysed by compression testing of single particles using a high accuracy micro-compression testing machine (Shimadzu™ Model MCT-510) with a flat indenter of 50 μm diameter, a test force of from 9.8 to 4903 mN and a loading rate of 7.75 mN·s$^{-1}$.

Different sized particles were selected from different samples of composite particles (samples A1 to A4 were obtained from framework A, and samples B1 and C1 were obtained from frameworks B and C respectively). For each target particle size at least 5 particles with a size close to the target size were analysed. Particle sizes were measured by the specimen dimension measurement function of the Model MCT-510 that uses the average of geometrical mean diameter and length of the specimen using an overhead image (obtained by Optical microscope). Each particle was secured between the flat indenter and a lower pressure plate before the test force of 9.8 to 4900 mN is applied to the specimen and increased at the loading rate. A sudden increase in displacement indicates the occurrence of a fracture in the particle. The force applied at the first fracture event is taken to be the particle crushing force. The crushing pressure is calculated from the crushing force applied divided by the area of the particle projected onto the plane of the indenter The average crushing pressure of multiple specimens of various sizes for each composite were taken as the final crushing pressure. The results are shown in Table 2.

TABLE 2

| Composite Sample | $P^1$ | Si wt % | Target Particle size (μm) | Average size of particles tested (at least 5 particles, μm) | Average crushing pressure (MPa) |
| --- | --- | --- | --- | --- | --- |
| A1 | 0.78 | 45 | 5  | 5.1  | 385 |
| A1 | 0.78 | 45 | 8  | 8.2  | 275 |
| A1 | 0.78 | 45 | 12 | 11.6 | 190 |
| A1 | 0.78 | 45 | 15 | 15.1 | 175 |
| A2 | 0.78 | 48 | 3  | 3.2  | 346 |
| A2 | 0.78 | 48 | 5  | 5.0  | 369 |
| A3 | 0.78 | 45 | 5  | 5.3  | 309 |
| A3 | 0.78 | 45 | 8  | 8.0  | 376 |
| A3 | 0.78 | 45 | 12 | 11.6 | 196 |
| A3 | 0.78 | 45 | 15 | 15.0 | 205 |
| A4 | 0.78 | 48 | 3  | 3.3  | 539 |
| A4 | 0.78 | 48 | 5  | 5.0  | 280 |
| A4 | 0.78 | 48 | 8  | 8.4  | 348 |
| A4 | 0.78 | 48 | 12 | 11.9 | 260 |
| B1 | 0.69 | 45 | 3  | 3.2  | 421 |
| B1 | 0.69 | 45 | 5  | 5.2  | 418 |
| B1 | 0.69 | 45 | 8  | 8.0  | 263 |
| B1 | 0.69 | 45 | 12 | 11.7 | 196 |
| B1 | 0.69 | 45 | 15 | 15.2 | 211 |
| C1 | 1.21 | 59 | 5  | 5.1  | 397 |
| C1 | 1.21 | 59 | 8  | 8.3  | 252 |
| C1 | 1.21 | 59 | 12 | 14.8 | 231 |

It will be understood that the crushing pressure of individual particles is subject to wide variation due to unpredictable differences between individual particles (e.g. the presence of defects, the shape of the particle where it contacts the indenter). In order to compensate for this inherent variability, the applicant has also calculated the average crushing pressure obtained across a wide variety of particles having $P^1$ from 0.69 to 1.21, micropore fractions from 0.54 to 0.78, and silicon wt % from 45% to 59%. Aggregated results from multiple experiments at particle sizes of approximately 3 μm, 5 μm, 8 μm, 12 μm and 15 μm are provided in Table 3 and clearly demonstrate the relationship between particle size distribution and robustness of the composite particles. Tables 2 and 3 demonstrate that particles of the invention with a particle size of 8 μm or less as measured by the micro-compression testing machine as described herein have a crushing pressure averaged over 5 particles of at least 250M Pa.

TABLE 3

| Average particle size (μm) | Average crushing pressure (MPa) |
| --- | --- |
| 3.2  | 435 |
| 5.1  | 360 |
| 8.2  | 303 |
| 11.8 | 211 |
| 15.0 | 206 |

Example 3—Electrochemical Testing

Test coin cells were made with negative electrodes comprising the silicon-carbon particulate material prepared as described above and having $D_{90}$ particle sizes both above and below 10 μm. A dispersion of Carbon Super P (conductive carbon) in CMC binder was mixed in a Thinky™ mixer. The silicon-carbon particulate material was added to the conductive dispersion and mixed for 30 min in the Thinky™ mixer. SBR binder was then added to give a CMC:SBR ratio of 1:1, yielding a slurry with a weight ratio of particulate silicon-carbon:CMC/SBR binder:conductive carbon of 70:16:14. The slurry was further mixed for 30 minutes in the Thinky™ mixer and was then coated onto a 10 μm thick copper substrate (current collector) and dried at 50° C. for 10 minutes, followed by further drying at 120-180° C. for 12 hours to thereby form an electrode comprising an active layer on the copper substrate.

Full Cell Manufacture

Full coin cells were made using circular negative electrodes of 0.8 cm radius cut from this electrode with a porous polyethylene separator and a nickel manganese cobalt (NMC532) positive electrode. The positive and negative electrodes were designed to form a balanced pair, such that the projected capacity ratio of the electrodes was around 0.9 (positive:negative). An electrolyte comprising 1 M $LiPF_6$ in a 7:3 solution of EMC/FEC (ethylene methyl carbonate/fluoroethylene carbonate) containing 3 wt % vinylene carbonate was then added to the cell before sealing.

The full coin cells were cycled as follows: A constant current was applied at a rate of C/25, to lithiate the anode, with a cut off voltage of 4.3 V. When the cut off was reached, a constant voltage of 4.3 V is applied until a cut off current of C/100 is reached. The cell was then rested for 10 minutes in the lithiated state. The anode is then delithiated at a constant current of C/25 with a cut-off voltage of 2.75 V. The cell was then rested for 10 minutes. After this initial cycle, a constant current of C/2 was applied to lithiate the anode with a 4.3 V cut off voltage, followed by a 4.3 V constant voltage with a cut off current of C/40 with rest time of 5 minutes. The anode was then delithiated at a constant current of C/2 with a 2.75V cut off. This was then repeated for the desired number of cycles. The discharge capacity in mAh/g (per gram of silicon-carbon composite particles) for three test cells is plotted in FIG. 1.

All three silicon-carbon materials used in the negative electrodes have similar silicon weight % and therefore have similar initial discharge capacities. Each material also has less than 10% of silicon content unoxidised at 800° C. when analysed by TGA as described herein. Samples X and Y have $D_{90}$ particle sizes of less than 10 μm (and $D_{50}$ particle sizes of 3.2 μm and 4.1 μm respectively) and demonstrate good capacity retention within the scope of the invention. Sample Z has a $D_{50}$ particle size of 6.5 μm and a $D_{90}$ particle size outside of the scope of the invention and demonstrates an increased rate of capacity loss. Without being bound by theory, it is observed that these results are consistent with the hypothesis that the small size and high microporosity of the particles of the invention is better able to accommodate stress due to the expansion of silicon over many cycles, as well as compressive stress as demonstrated above.

The invention claimed is:
1. A particulate material comprising a plurality of composite particles, wherein the composite particles comprise:
 (a) a porous carbon framework comprising micropores and/or mesopores, wherein
 the micropores and mesopores have a total pore volume as measured by gas adsorption of $P^1$ cm$^3$/g, wherein $P^1$ has a value of at least 0.6, and
 the $PD_{50}$ pore diameter as measured by gas adsorption is no more than 2 nm; and

(b) an electroactive material located within the micropores and/or mesopores of the porous carbon framework, wherein the electroactive material is silicon,
wherein
the composite particles have a $D_{90}$ particle diameter of no more than 10 μm; and
the particulate material has a Z value of no more than 10% as determined by TGA analysis in air, in which $Z=1.875\times[(M_f-M_{800})/M_f]\times100\%$, in which $M_f$ is the mass of the TGA sample at completion of oxidation and $M_{800}$ is the mass of the TGA sample at 800° C., and wherein the Z value is the percentage of unoxidized silicon at 800° C.

2. A particulate material according to claim 1, wherein $P^1$ has a value of at least 0.7.

3. A particulate material according to claim 1, wherein $P^1$ has a value of no more than 2.4.

4. A particulate material according to claim 1, wherein the $PD_{50}$ pore diameter of the porous carbon framework is no more than 1.6 nm.

5. A particulate material according to claim 1, wherein the $PD_{70}$ pore diameter of the porous carbon framework is no more than 3.5 nm and the $PD_{80}$ pore diameter of the porous carbon framework is no more than 5 nm.

6. A particulate material according to claim 1, wherein the porous carbon framework has a monomodal pore size distribution.

7. A particulate material according to claim 1, wherein the porous carbon framework has a bimodal or multimodal pore size distribution.

8. A particulate material according to claim 1, wherein the porous carbon framework has a bimodal or multimodal pore size distribution including at least one peak at less than 2 nm and at least one peak in the range of from 2.5 to 20 nm.

9. A particulate material according to claim 1, wherein the porous carbon framework further comprises macropores having a diameter in the range of from greater than 50 nm to 100 nm having a total volume $P^2$ cm³/g as measured by mercury porosimetry, wherein $P^2$ is no more than $0.2\times P^1$.

10. A particulate material according to claim 1, wherein at least a portion of the micropores and/or mesopores comprise void space that is fully enclosed by the electroactive material.

11. A particulate material according to claim 1, wherein the composite particles have a $D_{50}$ particle diameter in the range of 0.5 to 7 μm.

12. A particulate material according to claim 1, wherein the composite particles have a $D_{10}$ particle diameter of at least 0.2 μm.

13. A particulate material according to claim 1, wherein the volume-based particle size distribution has a positive skew.

14. A particulate material according to claim 1, wherein the composite particles are spheroidal particles having an average sphericity $S_{av}$ of at least 0.70.

15. A particulate material according to claim 1, wherein the fill factor of the electroactive material in the porous carbon framework is no more than 55%.

16. A particulate material according to claim 1, wherein the electroactive material is silicon and the weight ratio of silicon to carbon is in the range of from $[0.5\times P^1$ to $1.7\times P^1]$:1.

17. A particulate material according to claim 1, wherein the electroactive material is silicon and wherein at least 90 wt % of the silicon mass in the composite particles is located within the internal pore volume of the porous carbon framework.

18. A particulate material according to claim 1, wherein Z is no more than 5%.

19. A particulate material according to claim 1, wherein the volume of micropores and mesopores of the composite particles, as measured by nitrogen gas adsorption, is no more than $0.15\times P^1$.

20. A particulate material according to claim 1, wherein the composite particles have a BET surface area of at least 0.1 m²/g and no more than 150 m²/g.

21. A particulate material according to claim 1, having specific capacity on lithiation of 1200 to 2340 mAh/g.

22. A composition comprising a particulate material according to claim 1, and at least one other component selected from: (i) a binder; (ii) a conductive additive; and (iii) an additional particulate electroactive material.

23. An electrode comprising a particulate material according to claim 1 in electrical contact with a current collector.

24. A rechargeable metal-ion battery comprising:
(i) an anode, wherein the anode comprises an electrode according to claim 23;
(ii) a cathode comprising a cathode active material capable of releasing and reabsorbing metal ions; and
(iii) an electrolyte between the anode and the cathode.

25. A particulate material comprising a plurality of composite particles, wherein the composite particles comprise:
(a) a porous carbon framework comprising micropores and/or mesopores, wherein
the micropores and mesopores have a total pore volume as measured by gas adsorption of $P^1$ cm³/g, wherein $P^1$ has a value of 0.69 to 1.21, and
the micropore fraction of the porous carbon framework as measured by gas adsorption is from 0.54 to 0.78; and
(b) silicon located within the micropores and/or mesopores of the porous carbon framework,
wherein
the composite particles have a $D_{90}$ particle diameter of no more than 10 μm;
the silicon content of the composite particles is from 45 wt % to 59 wt %;
the particulate material has a Z value of no more than 10% as determined by TGA analysis in air, in which $Z=1.875\times[(M_f-M_{800})/M_f]\times100\%$, in which $M_f$ is the mass of the TGA sample at completion of oxidation and $M_{800}$ is the mass of the TGA sample at 800° C., and wherein the Z value is the percentage of unoxidized silicon at 800° C.; and
the composite particles have a BET surface area of no more than 30 m²/g.

26. A particulate material according to claim 25, wherein Z is no more than 5%.

27. A particulate material according to claim 25, wherein:
the porous carbon framework comprises amorphous carbon;
the total volume of macropores in the porous carbon framework is $P^2$ cm³/g, wherein $P^2$ is no more than $0.1\times P^1$;
the silicon is amorphous silicon; and
the specific capacity of the particulate material on lithiation is 1200 to 2340 mAh/g.

* * * * *